US012676643B2

(12) United States Patent　　　(10) Patent No.:　US 12,676,643 B2

Ozozlu　　　　　　　　　　　　(45) Date of Patent:　Jul. 7, 2026

(54) COORDINATED FREQUENCY SHARING BETWEEN SATELLITE AND TERRESTRIAL RADIO ACCESS NETWORKS

(71) Applicant: T-MOBILE INNOVATIONS LLC, Overland Park, KS (US)

(72) Inventor: Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/674,592

(22) Filed: May 24, 2024

(65) Prior Publication Data

US 2025/0365030 A1　　Nov. 27, 2025

(51) Int. Cl.
| | |
|---|---|
| *H04B 1/69* | (2011.01) |
| *H04B 1/707* | (2011.01) |
| *H04B 1/713* | (2011.01) |
| *H04L 5/00* | (2006.01) |
| *H04W 16/14* | (2009.01) |

(52) U.S. Cl.
CPC ............. *H04B 1/69* (2013.01); *H04L 5/0007* (2013.01); *H04W 16/14* (2013.01); *H04B 2001/6904* (2013.01)

(58) Field of Classification Search
CPC .............. H04B 1/69; H04B 2001/6904; H04B 7/18563; H04B 7/18558; H04W 16/14; H04L 5/0007
USPC .................................. 375/140, 141, 146, 147
See application file for complete search history.

(56) References Cited

U.S. PATENT DOCUMENTS

| | | | |
|---|---|---|---|
| 8,274,925 B2 * | 9/2012 | Jacks ................ | H04B 7/18558 370/316 |
| 2006/0165120 A1 * | 7/2006 | Karabinis .......... | H04B 7/18563 370/465 |

* cited by examiner

*Primary Examiner* — Phuong Phu

(74) *Attorney, Agent, or Firm* — SHOOK, HARDY & BACON L.L.P.

(57) ABSTRACT

Embodiments of the present disclosure are directed to systems and methods for avoiding or mitigating co-channel interference between terrestrial and satellite radio access networks (RANs). The systems and methods comprise one or more terrestrial base stations and one or more satellite base stations, each configured to transmit signals across overlapping frequency bands. The system further comprises applying an orthogonal spread spectrum code to the signals transmitted by the satellite base station, while the terrestrial base station transmits without such coding.

6 Claims, 5 Drawing Sheets

300

304

302

300

304

302

300

304

302

400

BASED ON A DETERMINATION THAT A FIRST BASE
STATION IS A TERRESTRIAL BASE STATION,
INSTRUCTING THE BASE STATION TO COMMUNICATE
A FIRST SET OF SIGNALS TO A FIRST COVERAGE
AREA USING A FIRST FREQUENCY BAND WITHOUT
APPLYING A CODE TO THE FIRST SET OF SIGNALS ～402

BASED ON A DETERMINATION THAT A SECOND BASE
STATION IS A NON-TERRESTRIAL BASE STATION,
INSTRUCTING  THE SECOND BASE STATION TO APPLY
A CODE TO A SECOND SET OF SIGNALS, WHEREIN
THE SECOND SET OF SIGNALS COMPRISES AT LEAST
A PORTION OF THE FIRST FREQUENCY BAND TO BE
COMMUNICATE TO THE FIRST COVERAGE AREA ～404

*FIG. 4*

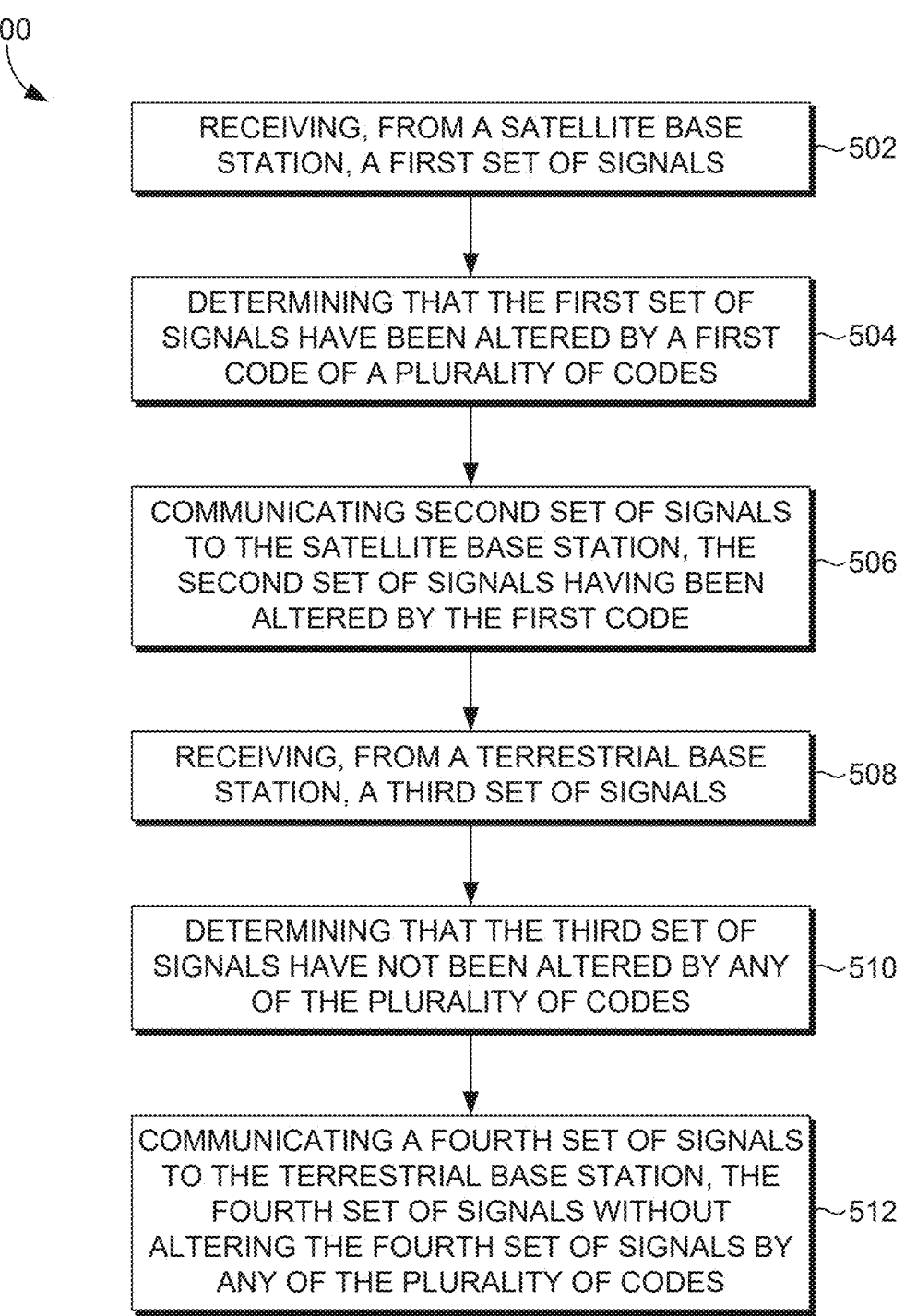

500

RECEIVING, FROM A SATELLITE BASE STATION, A FIRST SET OF SIGNALS ~502

DETERMINING THAT THE FIRST SET OF SIGNALS HAVE BEEN ALTERED BY A FIRST CODE OF A PLURALITY OF CODES ~504

COMMUNICATING SECOND SET OF SIGNALS TO THE SATELLITE BASE STATION, THE SECOND SET OF SIGNALS HAVING BEEN ALTERED BY THE FIRST CODE ~506

RECEIVING, FROM A TERRESTRIAL BASE STATION, A THIRD SET OF SIGNALS ~508

DETERMINING THAT THE THIRD SET OF SIGNALS HAVE NOT BEEN ALTERED BY ANY OF THE PLURALITY OF CODES ~510

COMMUNICATING A FOURTH SET OF SIGNALS TO THE TERRESTRIAL BASE STATION, THE FOURTH SET OF SIGNALS WITHOUT ALTERING THE FOURTH SET OF SIGNALS BY ANY OF THE PLURALITY OF CODES ~512

*FIG. 5*

COORDINATED FREQUENCY SHARING BETWEEN SATELLITE AND TERRESTRIAL RADIO ACCESS NETWORKS

SUMMARY

The present disclosure is directed to sharing radio frequency spectrum assets between satellite and terrestrial radio access networks, substantially as shown and/or described in connection with at least one of the Figures, and as set forth more completely in the claims.

Satellites will be increasingly integrated with conventional cellular telecommunication networks. In order to communicate with a wide range of user equipment (UE)s, it is most likely that satellites will be deployed with hardware and software configurations that utilize existing cellular telecommunication frequency bands to communicate with UEs at or near the ground. Particularly when satellites are statically configured to use a single frequency band, co-channel interference can be created by terrestrial base stations using the same band. By implementing mitigation procedures at the satellite base stations, a multi-domain telecommunication system comprising terrestrial and satellite RAN components can provide better overall service for UEs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein:

FIG. 4 depicts a flow diagram of an exemplary method for mitigating co-channel interference between a satellite and terrestrial base station, in accordance with embodiments described herein; and FIG. 5 depicts a flow diagram of an exemplary method for mitigating co-channel interference between a satellite and terrestrial base station, in accordance with embodiments described herein.

DETAILED DESCRIPTION

Figure 1:
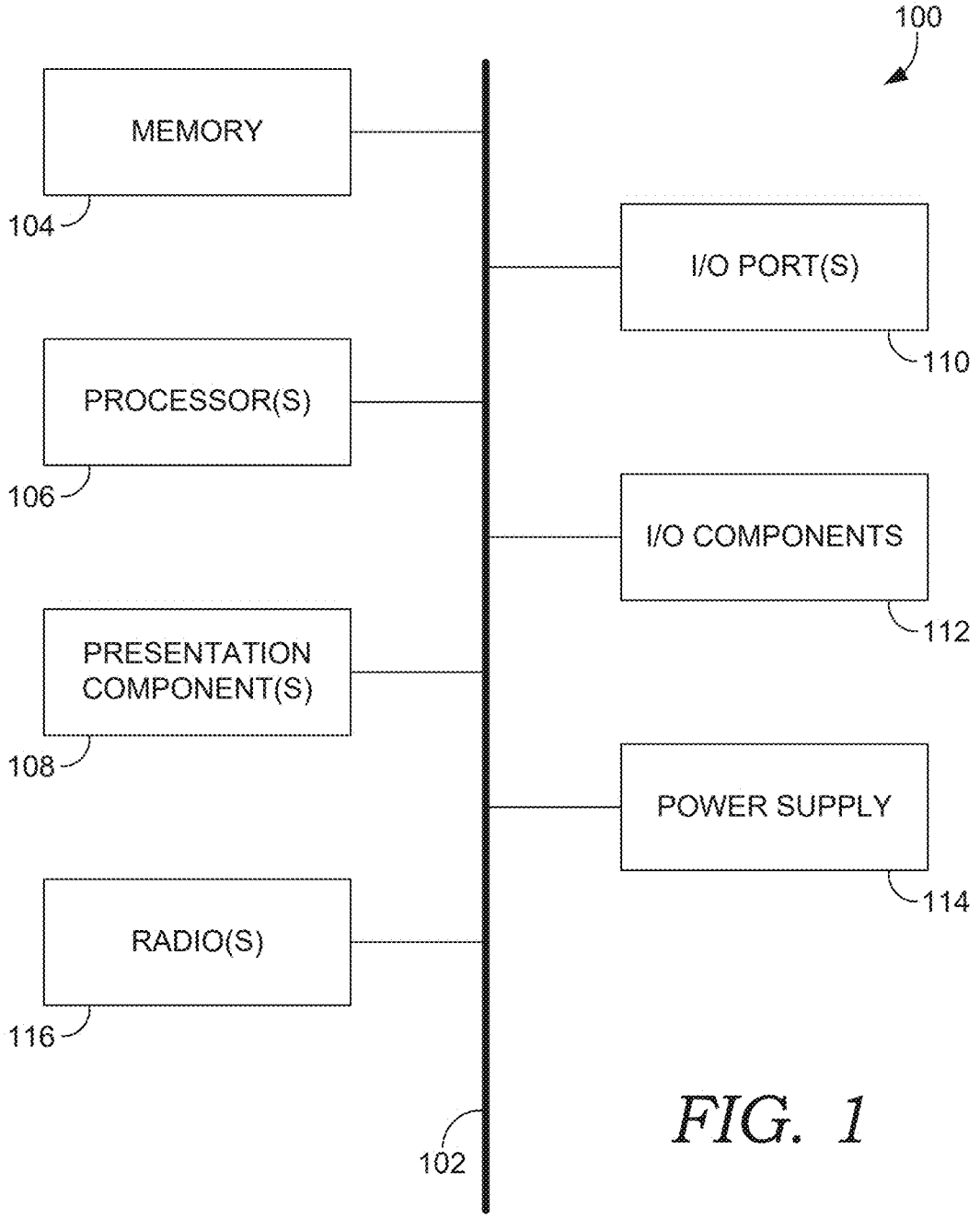
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein can be embodied as, among other things, a method, system, or computer-program product. Accordingly, the embodiments can take the form of a hardware embodiment, or an embodiment combining software and hardware. An embodiment takes the form of a computer-program product that includes computer-useable instructions embodied on one or more computer-readable media that can cause one or more computer processing components to perform particular operations or functions.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to utilize satellite communication systems to provide coverage to areas unserved by terrestrial base stations. Whether because of space launching restrictions on size/weight, the expense of manufacturing a satellite, or for any other reason, it is likely that satellites for integration into a cellular telecommunication network will feature hardware and software configurations with fewer potential configurations than a terrestrial base station. Further, in order to communicate with a broad range of UEs (i.e., to avoid forcing consumer to purchase a new, special purpose UE), satellites for use with cellular networks are anticipated to utilize existing cellular radio frequency spectrum resources. When a satellite uses the same frequency band as a terrestrial base station, the terrestrial base station can cause co-channel interference for UEs attempting to communicate with the satellite, even beyond the usable range (i.e., cell edge) of the terrestrial base station.

In order to prevent or mitigate co-channel interference, the present disclosure is directed to systems and methods for implementing co-channel mitigation procedures. In aspects where configuration changes to satellites can be difficult or impossible, mitigation procedures can be implemented and communicated to the satellites to enable those procedures. By modifying signal transmission characteristics or implementing spread spectrum coding, changes can be made to reduce or eliminate co-channel interference between the terrestrial and satellite RANs, improving the wireless connection for UEs-particularly those that are wirelessly connected to a distant satellite.

Accordingly, a first aspect of the present disclosure is directed to a system for mitigating co-channel interference of a satellite base station. The system comprises a base station of a terrestrial radio access network (RAN) configured to instruct the first base station to communicate the first set of signals using the first frequency band without applying a code to the first set of signals based on a determination that the first base station is a terrestrial base station. The system further comprises instructions to determine that determination that a second base station is a non-terrestrial base station. The system additionally comprises instructing the second base station to apply the code to a second set of signals, wherein at least a portion of the second set of signals and the first set of signals overlap in frequency. The system further comprises instructing the second base station to communicate the second of set of signals following the application of the code to the second set of signals.

A second aspect of the present disclosure is directed to a method for mitigating co-channel interference between multi-domain components of one or more radio access networks. The method comprises instructing a first base station to communicate a first set of signals using a first frequency band without applying any code from a plurality of codes to the first set of signals. The method further comprises instructing a second base station to apply a first code from the plurality of codes to a second set of signals. The method further comprises instructing the second base station to communicate the second set of signals following the application of the first code to the second set of signals.

Another aspect of the technology described herein is directed to one or more non-transitory computer readable media that, when executed by one or more computer processing components, cause the one or more computer processing components to perform a method for mitigating co-channel interference between a terrestrial base station and a satellite. The one or more computer processing components are caused to receive, from the satellite base station, a first set of signals. The one or more computer processing components are further caused to determine that the first set of signals have been altered by a code. The one or more computer processing components are further caused to communicate a second set of signals to the satellite base station, the second set of signals having been altered by the code. The one or more computer processing components are further caused to receive, from the terrestrial base station, a third set of signals. The one or more computer processing components are further caused to determine that the third set of signals have not been altered by any of a plurality of codes. The one or more computer processing components are further caused to communicate a fourth set of signals to the terrestrial base station, the fourth set of signals without altering the fourth set of signals by any of the plurality of codes.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 can be referred to herein as a user equipment, wireless communication device, or user device, The computing device 100 can take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure can be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure can be practiced in a variety of system configurations, including handheld devices, consumer electronics, general-purpose computers, specialty computing devices, etc. Implementations of the present disclosure can also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what can be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one can consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 can be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which can be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 can carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the first radio 120 and the second radio 130 can be configured to communicate using the same protocol but in other aspects they can be configured to communicate using different protocols. In some embodiments, including those that both radios or both wireless links are configured for communicating using the same protocol, the first radio 120 and the second radio 130 can be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 can be configured to communicate with a base station according to a cellular communication protocol (e.g., 4G, 5G, 6G, or the like), and the second radio 130 can configured to communicate with one or more other computing devices according to a local area communication protocol (e.g., IEEE 802.11 series, Bluetooth, NFC, z-wave, or the like).

Figure 2:
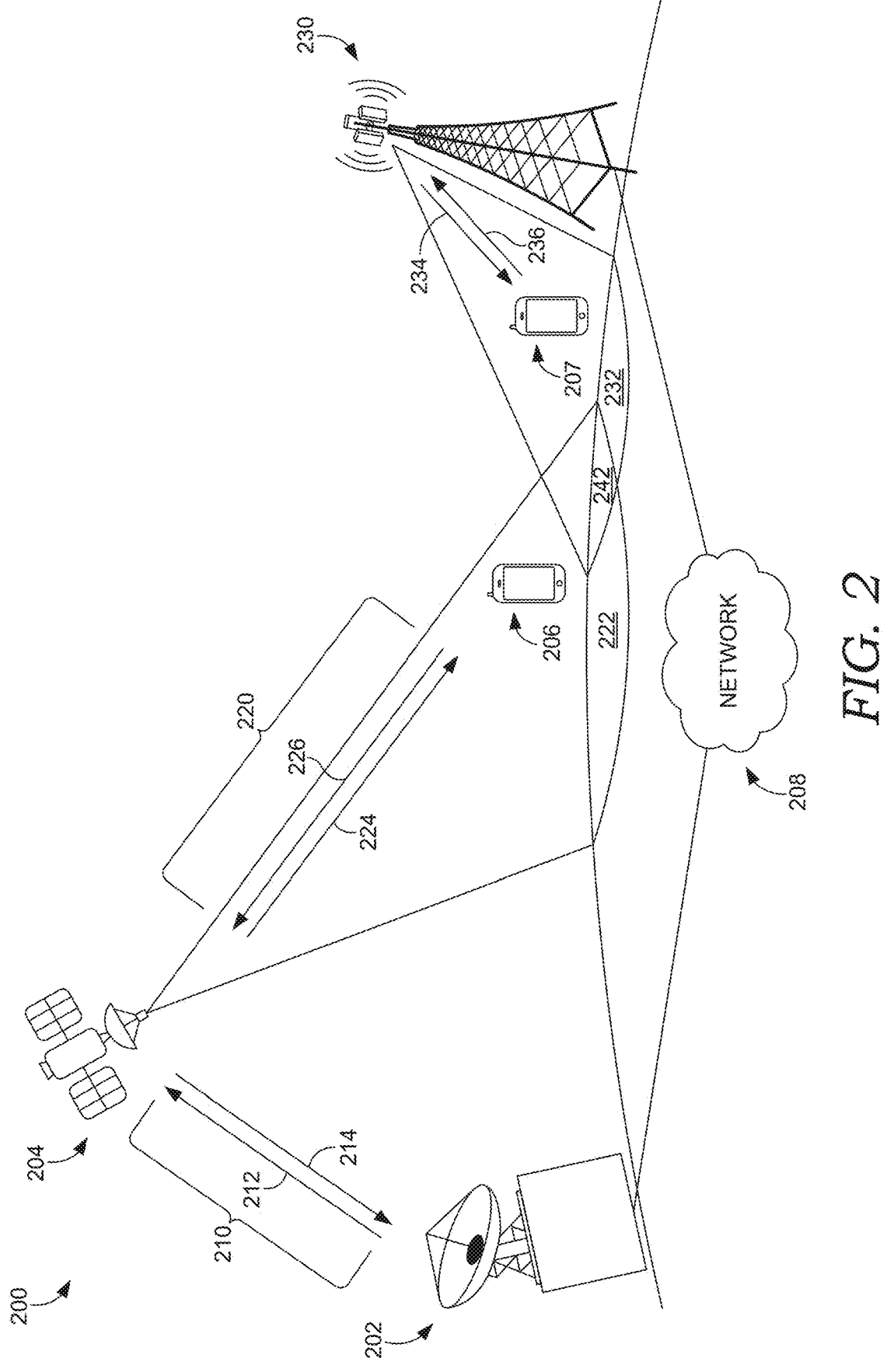
FIG. 2 illustrates a diagram of an exemplary environment in which implementations of the present disclosure can be employed.

Turning now to FIG. 2, an exemplary network environment is illustrated in which implementations of the present disclosure can be employed. Such a network environment is illustrated and designated generally as network environment 200. At a high level the network environment 200 comprises a gateway 202, a satellite 204 of a satellite radio access network (RAN), at least one UE, a terrestrial base station 230 of a terrestrial RAN, and a network 208. Though the composition of network environment 200 illustrates objects in the singular, it should be understood that more than one of each component is expressly conceived as being within the bounds of the present disclosure; for example, the network environment 200 can comprise multiple gateways, multiple distinct networks, multiple UEs, multiple satellites that communicate with a single gateway, multiple terrestrial base stations, and the like. Similarly, though UEs, such as a first UE 206 and a second UE 207 are illustrated as cellular phones, a UE suitable for implementations with the present disclosure can be any computing device having any one or more aspects described with respect to FIG. 1.

The network environment 200 includes a gateway 202 communicatively connected to the network 208 and the satellite 204. The gateway 202 can be connected to the network 208 via one or more wireless or wired connections and is connected to the satellite 204 via a feeder link 210. The gateway 202 can take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 can communicate with a plurality of satellites, including the satellite 204. The network 208 comprises any one or more public or private networks, any one or more of which can be configured as a satellite network, a publicly switched telephony network (PSTN), or a cellular telecommunications network. In aspects, the network 208 can comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network can be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 204. The satellite 204 is generally configured to relay communications between the gateway 202 and the UE 206. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 can communicate with the UE 206 using any wireless telecommunication protocol desired by a network operator, including but not limited to 3G, 4G, 5G, 6G, 802.11x and the like. Though shown as having a single beam providing coverage to a satellite coverage area 222, the satellite 204 can be configured to utilize a plurality of individual beams to communicate with multiple different areas at or near the same time. Similarly, though a single forward downlink 224 and a single return uplink 226 are illustrated, the UE 206 can utilize multiple downlinks and/or multiple uplinks to communicate with the satellite 204, using any one or more frequencies as desired by a satellite or network operator.

Generally, the satellite 204 is characterized by its orbit around the earth. The orbit of any particular satellite will vary by operator desire and/or intended use; for example, a satellite suitable for use with the present disclosure can be characterized by its maximum orbital altitude and/or orbital period as Low Earth Orbit (LEO), Medium Earth Orbit (MEO), and High Earth Orbit (HEO). Though not rigidly defined, an LEO satellite can orbit with a maximum orbital altitude of less than approximately 1,250 miles, an MEO satellite can orbit with a maximum orbital altitude generally between 1,250 and 22,000 miles, and an HEO satellite can orbit with a maximum orbital altitude of greater than approximately 22,000 miles. In some, but not all cases, a satellite in HEO can be considered geosynchronous on the basis that its orbital period is approximately equal to the length of a sidereal or solar day (approximately 24 hours); generally, a satellite in geosynchronous orbit will appear to be in the same position relative to a fixed point on the surface of the earth at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth.

The network environment 200 includes one or more terrestrial base stations, represented by terrestrial base station 230. The terrestrial base station 230 is generally configured to relay communications between the network 208 and one or more UEs, such as the second UE 207. The terrestrial base station 230 communicates signals to the UE 206 using a terrestrial downlink 234 and receives signals from the second UE 207 using a terrestrial uplink 236. The terrestrial base station 230 can communicate with the second UE 207 using any wireless telecommunication protocol desired by a network operator, including but not limited to 3G, 4G, 5G, 6G, 802.11x and the like. Though shown as having a single beam providing coverage to a terrestrial coverage area 232, the terrestrial base station 230 can be configured to utilize a plurality of individual beams to communicate with multiple different areas at or near the same time. Similarly, though a single terrestrial downlink 234 and a single terrestrial uplink 236 are illustrated, the second UE 207 can utilize multiple downlinks and/or multiple uplinks to communicate with the terrestrial base station 230, using any one or more frequencies as desired by a mobile network operator.

In aspects of the present disclosure, there can exist an overlapping coverage area 242, wherein the satellite coverage area 222 and the terrestrial coverage area 232 at least partially overlap. In instances where the satellite 204 and the terrestrial base station 230 utilize the same radio frequency spectrum resources, co-channel interference can exist in and/or around the overlapping coverage area 242. Generally, co-channel interference is a type of interference that occurs in telecommunications when two or more transmitters, such as the satellite 204 and the terrestrial base station 230, broadcast on the same frequency channel. The interference can lead to reduced signal quality and even cause a loss of communications for UEs in or near the overlapping coverage area 242. Though illustrated in FIG. 2 as being an overlap of the satellite coverage area 222 and the terrestrial coverage area 232, the overlapping coverage area 242 of the present disclosure is not limited to where intended coverage areas (i.e., cells) overlap, but rather where a threshold high level of co-channel interference occurs.

Determining that a threshold high level of co-channel interference is occurring can be the result of identifying overlapping coverage areas. One or more computer processing components, whether of the network 208, the satellite 204, and/or the terrestrial base station 230, can determine the approximate coverage areas associated with each radio access network. Such a determination can be based on ideal or planned coverage areas, or modeled based on real world conditions including factors like observed interference, signal transmission power, traffic, and the like. Accordingly, the satellite coverage area 222 and the terrestrial coverage area 232, can be determined to at least partially overlap or that an edge of the satellite coverage area 222 is within a predetermined threshold distance of an edge of the terrestrial coverage area 232.

In aspects where the operational coverage of satellite 204 intersects with that of terrestrial base station 230, the network can mitigate signal interference. Network 208 mitigates signal interference by instructing satellite 204, via gateway 202, to adapt its return downlink 214 through the implementation of a first orthogonal code. This first orthogonal code is specifically an orthogonal spread spectrum code, configured to modify the downlink signals communicated by the satellite 204. By employing such a code, the downlink signals are spread across the available spectrum in a manner that maximizes bandwidth efficiency while concurrently minimizing interference with terrestrial signals. The orthogonal code causes the downlink signals of the satellite 204 to be mathematically independent of the other signals such as those communicated by the terrestrial base station 230. In some aspects, the first code utilized in altering the downlink communications is selected from a set of codes configured for orthogonal modifications of signals. This plurality of codes are configured to perform orthogonal spread spectrum coding on both downlink and uplink signals. Each code within this set is capable of altering the downlink signals of the satellite 204 and uplink signals of the UE 206 in a way that maintains its orthogonality with other signals, such as those communicated from the terrestrial base station 230.

The selected orthogonal code, comprising a code sequence, is integrated into the signal modulation process of the satellite 204, whereby each bit of original data is encoded using the chosen code sequence. This encoding process effectively spreads the spectrum of the downlink signal, aligning each bit of data with a specific, distinct pattern of the code. As a result, the spectral components of the downlink signals are distributed more broadly across the available frequency band. Once the downlink signal is encoded using the selected orthogonal code, the satellite 204 communicates it to one or more UEs, such as UE 206.

In various embodiments, the orthogonal spread code can be selected from one of a Walsh code, a Hadamard code, an Orthogonal Variable Spreading Factor (OVSF) cod, ore a Gold code. Additional options like Kasami codes, and Barker codes, can also be used. Zadoff-Chu sequences can also be used as the orthogonal spread code. This list is not meant to be limiting, as other orthogonal codes can be contemplated for use in various implementations herein Upon receiving the encoded downlink communications, UE 206 determines which code was used by satellite 204 to alter downlink signals, from the plurality of available codes. This determination process can occur through multiple mechanisms: UE 206 can cycle through a pre-determined set of codes until a match is found, satellite 204 could directly transmit the code identity to the UE 206, or network 208 might relay the code identity information. Each of these methods ensures that the UE 206 accurately identifies the code. Once the UE 206 successfully identifies the code used by the satellite 204, it employs this code identity to decode the altered return downlink 214. The identified code serves as the key to reversing the modifications imposed on the original signal during transmission. This decoding process involves correlating the received signal with the known code pattern. By aligning the received, spread-spectrum signal with the corresponding orthogonal code sequence, the UE 206 effectively despreads the signal. This despread process reconstructs the signal's original narrowband form by collapsing the spread spectral components back into their original state, thereby extracting the embedded data.

Additionally, the UE 206 can encode its uplink 226 using the same code that was used for the downlink communications. The UE 206 is equipped to encode its uplink 226 to the satellite 204 using the identical code, or a different code, that was applied to modify the forward downlink 224 from satellite 204. The satellite 204 can then identify the code used in a similar way as the UE 206 and then decode the uplink 226.

To mitigate potential interference and avoid confusion in signal processing, network 208 can instruct the terrestrial base station 230 to abstain from using any signals altered with any code from the plurality of codes used in the satellite communications. This directive helps in maintaining a clear distinction between the types of signal alterations used in different segments of the network, ensuring that each node within the network operates without interference from incompatible coding schemes.

Figure 3A:
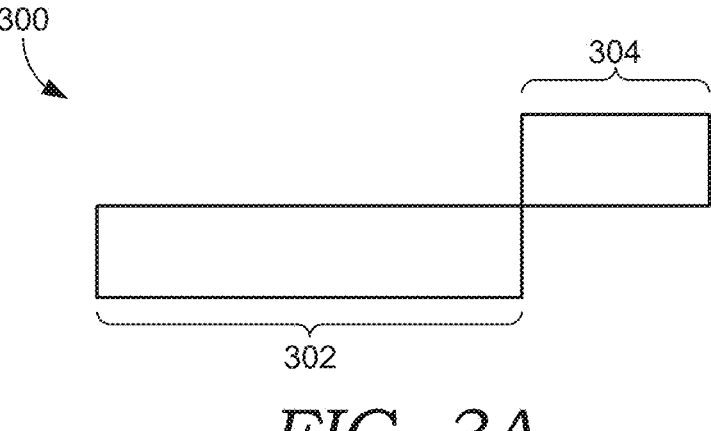
FIG. 3A through FIG. 3C illustrate diagrams of exemplary frequency spectrum usage according to implementation of the present disclosure.
Figure 3B:
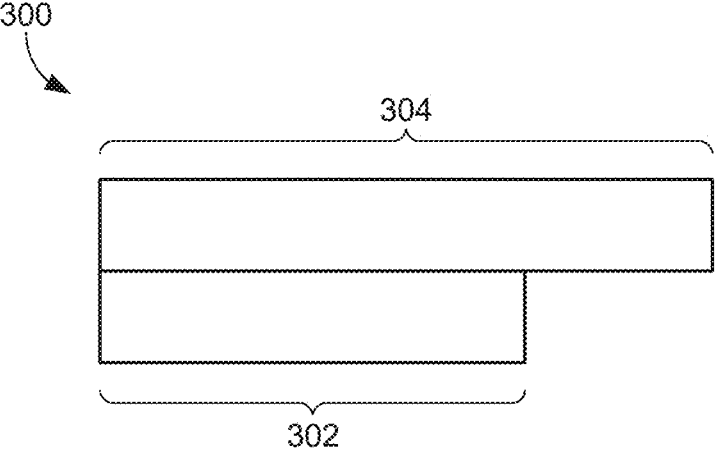
Figure 3C:
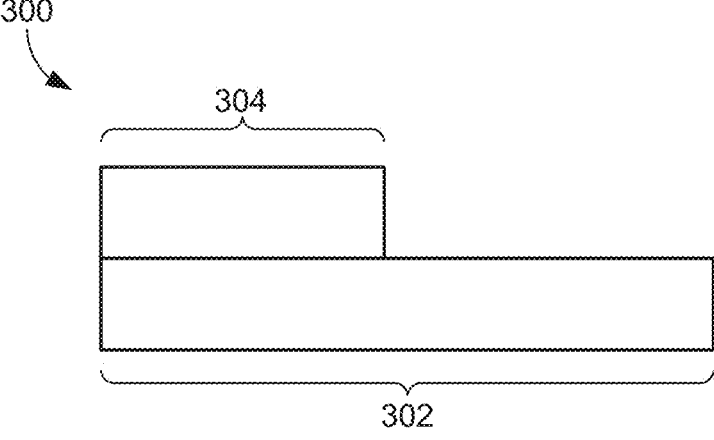

Moving now to FIGS. 3A-3C, which illustrate a schematic diagram of spectrum allocation to a terrestrial base station, such as terrestrial base station 230, and a satellite, such as satellite 204. In particular, FIG. 3A illustrates an initial allocation of the frequency spectrum where the terrestrial spectrum portion 302 and the satellite spectrum portion 304 are distinctly separated without any overlap. In this scenario, the terrestrial spectrum portion 302 is allocated 15 MHz of the available spectrum and the satellite spectrum portion 304 is allocated 5 MHz of the available spectrum. In this example, the use of frequency bands is used in a conventional setup where each type of service—terrestrial and satellite—operates independently within its designated spectrum space, without the influence of any coding schemes.

FIG. 3B depicts the change in the spectrum allocation following the application of an orthogonal spread spectrum code to the satellite communications. Here, the terrestrial spectrum portion 302 remains unchanged at an allocation of 15 MHz, indicating that no coding scheme has been applied to this segment. Conversely, the satellite spectrum portion 304 expands to cover 20 MHz. This expansion is a result of applying the orthogonal spread spectrum code, which spreads the satellite signals across a wider frequency band. The satellite spectrum portion, in this example, occupies an overlapping portion of the available spectrum and a larger portion of the available spectrum. The application of this coding scheme effectively utilizes a greater portion of the spectrum, enhancing the capacity and robustness of satellite communications without impacting the terrestrial communications segment.

In an additional aspect, as seen in FIG. 3C, the satellite spectrum portion 304 can be modified by a coding scheme so as to overlap with the terrestrial spectrum portion 302 but occupy a smaller portion of the available spectrum than the terrestrial spectrum portion 302. For example, the terrestrial spectrum portion 302 can cover the same 15 MHz while the satellite spectrum portion 304 now covers 10 MHz.

Turning now to FIG. 4, a flow chart representing a method 400 is provided. At a first step 402, based on the determination that a first base station, such as terrestrial base station 230, is a terrestrial base station, the method involves instructing the base station to communicate a first set of signals to a first coverage area using a first frequency band, without applying any code to the first set of signals. At the second step 404, it is determined that a second base station is a satellite base station, such as satellite 204. Once the second base station is confirmed to be a satellite base station, it is instructed to apply a code to a second set of signals. This second set of signals includes at least a portion of the first frequency band, which is communicated to the first coverage area, in accordance with one or more aspects described in relation to FIG. 2.

Turning now to FIG. 5, a flow chart representing a method 500 is provided in accordance with one or more aspects described in relation to FIG. 2. At a first step 502, receiving, from a satellite base station, such as satellite 204, a first set of signals. At the second step 504, it is determined that that the first set of signals have been altered by a first code of a plurality of codes. At a third step 506, communicating a second set of signals to the satellite base station, the second set of signals having been altered by the first code. At a fourth step 508, receiving, from a terrestrial base station, such as terrestrial base station 230, a third set of signals. At a fifth step 510, determining that the third set of signals have not been altered by any of the plurality of codes. At a sixth step 512, communicating a fourth set of signals to the terrestrial base station, the fourth set of signals without altering the fourth set of signals by any of the plurality of codes.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for mitigating co-channel interference of a satellite link, the system comprising:

a first base station of a radio access network (RAN) configured to wirelessly communicate a first set of signals using a first frequency band; and one or more computer processing components configured to perform operations comprising:

based on a determination that the first base station is a terrestrial base station, instructing the first base station to communicate the first set of signals using the first frequency band without applying a code to the first set of signals;

based on a determination that a second base station is a non-terrestrial base station, instructing the second base station to apply the code to a second set of signals to generate a third set of signals, wherein at least a portion of the second set of signals and the first set of signals overlap in frequency;

based on a determination that the first base station and the second base station provide overlapping coverage, instructing the second base station to apply the code to the second set of signals to generate the third set of signals;

based on a determination that co-channel interference is occurring between the first base station and the second base station, instructing the second base station to apply the code to the second set of signals to generate the third set of signals; and following the application of the code to the second set of signals, instructing the second base station to communicate the second of set of signals.

2. The system of claim 1, wherein the code is a first code of a plurality of codes.

3. The system of claim 1, further comprising instructing the second base station to communicate to a UE, an identification of the code.

4. The system of claim 1, wherein the code is a spreading code.

5. The system of claim 4, wherein the code is an orthogonal spreading code.

6. The system of claim 5, wherein the code is selected from one of a Walsh code, a Hadamard code, an Orthogonal Variable Spreading Factor (OVSF) code, or a gold code.

* * * * *